United States Patent
Yoo et al.

(10) Patent No.: US 9,494,814 B2
(45) Date of Patent: Nov. 15, 2016

(54) MULTI PANEL DISPLAY DEVICE

(71) Applicant: Samsung Display Co., Ltd., Yongin, Gyeonggi-Do (KR)

(72) Inventors: Byung Han Yoo, Seoul (KR); Byoung Ho Cheong, Yongin-si (KR); Oleg Prudnikov, Hwaseong-si (KR); Dae Ho Yoon, Suwon-si (KR); Moon Gyu Lee, Suwon-si (KR); Hyeong Gyu Jang, Busan (KR)

(73) Assignee: SAMSUNG DISPLAY CO., LTD. (KR)

( * ) Notice: Subject to any disclaimer, the term of this patent is extended or adjusted under 35 U.S.C. 154(b) by 163 days.

(21) Appl. No.: 14/158,587

(22) Filed: Jan. 17, 2014

(65) Prior Publication Data

US 2015/0055218 A1    Feb. 26, 2015

(30) Foreign Application Priority Data

Aug. 21, 2013    (KR) .......................... 10-2013-0099155

(51) Int. Cl.
G02F 1/1333    (2006.01)
G02F 1/1335    (2006.01)
G02B 5/30    (2006.01)

(52) U.S. Cl.
CPC ..... *G02F 1/13336* (2013.01); *G02F 1/133524* (2013.01); *G02B 5/3033* (2013.01); *Y10T 29/49826* (2015.01)

(58) Field of Classification Search
CPC ................. G02B 27/027; G02B 27/09; G02B 27/0994; G02B 5/30; G02B 5/3025–5/3058; G02B 6/08; G02B 6/1228; G09G 5/00–5/005; G09G 3/36; G09G 3/3611; G09G 3/007;
(Continued)

(56) References Cited

U.S. PATENT DOCUMENTS 5,846,650 A * 12/1998 Ko .......................... G02B 1/105
    296/84.1
9,092,196 B2 * 7/2015 Yoo ........................ G06F 1/1641
(Continued)

FOREIGN PATENT DOCUMENTS

JP    3699456 B2    7/2005
KR    10-0856980 B1    8/2008
(Continued)

*Primary Examiner* — Stephone B Allen
*Assistant Examiner* — Adam W Booher
(74) *Attorney, Agent, or Firm* — Innovation Counsel LLP

(57) ABSTRACT

The present invention provides a display device including: a plurality of display panels including display areas, and non-display areas positioned alongside the display areas; an optical member having one side connected to a part of one of the display areas and an opposing side extending over an adjacent non-display area, the optical member configured to magnify an image from the part of one of the display areas and to project the magnified image over the adjacent non-display area. A multi panel display device according to the exemplary embodiment of the present invention may prevent the phenomena of image discontinuity and image distortion at edges between the display panels, and adjust a polarization characteristic to provide a high-quality large screen capable of implementing a 3D image and the like.

13 Claims, 19 Drawing Sheets

(58) Field of Classification Search
CPC ............... G09G 2300/026; G09G 2300/02;
G02F 1/13336; G02F 1/133524; G02F
1/1335; G02F 1/133502; G02F
1/133509; G02F 1/133528; G02F
2001/133388; G02F 2001/133391;
G02F 2001/133531; G02F
2001/13356; G02F 2001/133562;
G06F 3/1423; G06F 3/1446; C03B
2203/40; C03B 37/16; C03B 37/14;
C03B 37/028; H04N 9/12; H04N
9/3147; Y10T 29/49826
USPC ............ 359/483.01, 485.01, 485.03–485.06,
359/487.01–487.03, 487.06, 601; 345/1.1,
345/1.3, 30, 32, 102, 690
See application file for complete search history.

(56) References Cited

U.S. PATENT DOCUMENTS

| | | | |
|---|---|---|---|
| 2010/0238090 A1 | 9/2010 | Pomerantz et al. | |
| 2010/0247811 A1* | 9/2010 | Yokota | C08K 5/3492 428/1.31 |
| 2011/0215990 A1 | 9/2011 | Liesenberg | |
| 2011/0255301 A1* | 10/2011 | Watanabe | G02F 1/13336 362/558 |
| 2011/0279487 A1 | 11/2011 | Imamura et al. | |

FOREIGN PATENT DOCUMENTS

| | | |
|---|---|---|
| KR | 10-2011-0137922 A | 12/2011 |
| KR | 10-2014-0068626 A | 6/2014 |
| KR | 10-2014-0139844 A | 12/2014 |

* cited by examiner

MULTI PANEL DISPLAY DEVICE

CROSS-REFERENCE TO RELATED APPLICATION

This application claims priority to, and the benefit of, Korean Patent Application No. 10-2013-0099155 filed in the Korean Intellectual Property Office on Aug. 21, 2013, the entire contents of which are incorporated herein by reference.

BACKGROUND (a) Field of the Invention

Embodiments of the present invention relate generally to flat panel displays. More specifically, embodiments of the present invention relate to a multi panel display device.

(b) Description of the Related Art

In general, a flat panel display, such as a liquid crystal display (LCD) or a plasma discharge panel (PDP), produces high resolution images, and is accepted technology for producing large screen displays. However, as display size increases, costs also increase, and defects such as quality deterioration due to a signal delay and the like, become more likely.

In order to overcome this problem, a method of implementing a large display device by using a plurality of display panels has been developed. Applicants of such methods include use as an advertising display installed at a rooftop of a building, a large electronic display installed at a sports complex and the like, an on-the-spot display used for concerts and the like, etc. However, each display panel typically has a region at an edge portion in which an image is not able to be continuously displayed.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a multi panel display device implementing a high-quality large image, in which a problem of discontinuity of an image is solved by using an optical member provided in a non-display area to display the image in the non-display area.

Further, embodiments of the present invention provide a multi panel display device implementing a high-quality large image, which is capable of preventing an image distortion phenomenon and implementing a 3D image and the like by using a cover of an optical member capable of adjusting a polarization characteristic of the optical member.

An exemplary embodiment of the present invention provides a display device including: a plurality of display panels including display areas configured to display an image, and non-display areas positioned alongside the display areas; an optical member having one side connected to a part of one of the display areas and an opposing side extending over an adjacent non-display area, the optical member configured to magnify an image from the part of the display areas and to project the magnified image over the adjacent non-display area.

Each display area may include a plurality of pixels, and the one side of the optical member is positioned over at least some of the pixels.

Each display area may include a main pixel area and a peripheral pixel area positioned between the main pixel area and the adjacent non-display area, the optical member being positioned over the peripheral pixel area of the one of the display areas, and each pixel provided in the main pixel area may have a larger area than that of each pixel provided in the peripheral pixel area.

The optical member may be a bundle of optical fibers or a bundle of optical sheets.

The optical member may be positioned to correspond to pixels of at least one of the peripheral pixel areas.

Faces of the opposing sides of the optical member may collectively form a curved surface extending from one of the display areas to another one of the display areas.

The display device may further comprise a cover covering the optical member, and the cover may comprise a transparent polymer or glass.

The cover may comprise polymethyl methacrylate (PMMA).

The cover may be configured to alter a polarization of light emitted from the display panel and passing therethrough.

A thickness of the cover may vary by position along the cover.

A refractive index of the cover may be lower than a refractive index of the optical member.

A thickness of the cover may be from about 0.1 to about 10 mm.

An upper surface of the cover may have a curved surface or a flat surface.

The cover may be a polarization film or further include a polarization film on at least an upper portion of the cover.

A polarization axis of the polarization film may have the same direction as that of a polarization axis of the display area.

The cover may cover one entire display panel, an upper surface of the cover may have substantially the same area as an upper surface of the corresponding display panel, and a side surface of the cover may be oriented at the same inclination angle as that of a surface of the optical member.

Another exemplary embodiment of the present invention provides a method of manufacturing a display device, including: preparing a cylinder having a cylindrical pillar or an elliptical pillar and configured to act as a supporting body of an optical member; winding optical fibers or optical sheets around the cylinder; cutting the cylinder and the optical fibers or the optical sheets wound around the cylinder, so as to form an optical member; attaching one end of the optical member to a display panel; and attaching a cover to an upper surface of the optical member attached to the display panel.

As described above, the multi panel display device according to the exemplary embodiment of the present invention may prevent the phenomena of image discontinuity and image distortion at an edge between display panels, and may adjust a polarization characteristic to provide a high-quality large screen capable of implementing a 3D image and the like.

DETAILED DESCRIPTION OF THE EMBODIMENTS

Figure 1:
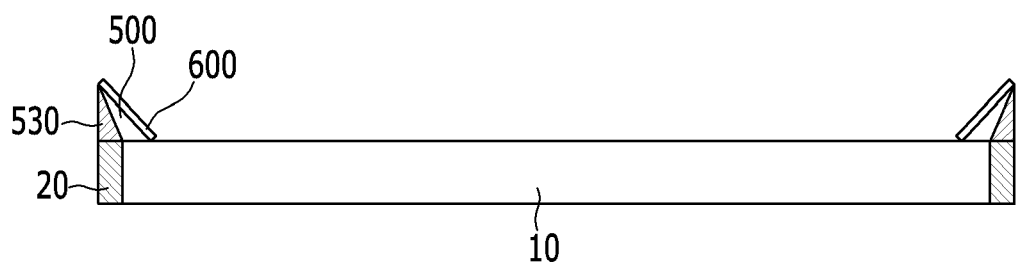
FIG. 1 is a perspective view of a display device adopting an optical member and a cover according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Accordingly, the drawings are not necessarily to scale. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. All numerical values are approximate and may vary.

Now, a multi panel display device according to an exemplary embodiment of the present invention will be described in detail with reference to the drawings.

A multi panel display device in which an optical member 500 attached to a cover 600 according to an exemplary embodiment of the present invention is applied to a plurality of panels will be described in detail with reference to FIG. 1.

FIG. 1 is a perspective view of a display device adopting the optical member 500 and the cover 600 according to an exemplary embodiment of the present invention.

The multi panel display device according to this exemplary embodiment of the present invention includes a display panel including a display area 10 and a non-display area 20, a cylinder 530, the optical member 500, and the cover 600 of the optical member 500.

Two or more display panels are provided, and the display area 10 of the display panel is a region displaying an image, and the non-display area 20 thereof is a region outside the display area 10 in the display panel, and may be covered by a constituent element called a top cover, a top chassis, or a bezel.

The display area 10 includes a plurality of pixels arranged in a matrix form. Each pixel may include pixel electrodes and thin film transistors connected to the pixel electrodes. The pixels of the display area 10 are configured to display an image in known manner. In a case where the display panel is a liquid crystal display, the display panel provides an electric field generated by the pixel electrodes and a common electrode to a liquid crystal layer, in order to display grayscales.

The display area 10 includes a main pixel area, and a peripheral pixel area formed outside of the main pixel area. A plurality of main pixels is provided in the main pixel area, and a plurality of peripheral pixels is provided in the peripheral pixel area.

The peripheral pixel area extends alongside the non-display area 20 to be close to a side of the adjacent display panel. That is, in the display panel, the peripheral pixel area is an area positioned between the main pixel area and the non-display area 20 at the display panel side. The peripheral pixels and the main pixels both display an image.

The display panels may be provided on the same flat surface, or may be provided on a curved surface or a bent surface instead of being on the same flat surface. The display panel may have a rigid form, or a flexible form which is not fixed.

Each display panel displays an image, and may include an organic light emitting display panel, a liquid crystal display panel, an electrowetting display panel, an electrophoretic display panel, a microelectromechanical system (MEMS) display panel, a plasma display panel, and the like.

For example, in a case where the display panels 100 and 200 are liquid crystal display panels, the display panels each include a base substrate, an opposing substrate opposite to the base substrate, and a liquid crystal layer formed between the base substrate and the opposing substrate. According to this exemplary embodiment of the present invention, the base substrate may include a plurality of pixel electrodes, and a plurality of thin film transistors electrically connected with the pixel electrodes one to one. Each thin film transistor switches a driving signal provided to a corresponding pixel electrode side. Further, the opposing substrate may include a common electrode forming an electric field controlling an arrangement of liquid crystals together with the pixel electrodes. The display panels serve to drive the liquid crystal layer to display an image in a front or forward direction.

In the meantime, in this exemplary embodiment of the present invention, the homogeneous arranged display panels are provided, but the present invention is not limited thereto, and heterogeneous display panels may alternatively be provided. Further, the various display panels may be of the same size or may be of different sizes.

One end of the optical member 500 is connected to the peripheral pixel area in the display area 10. That is, one end (preferably, a half) of the optical member 500 is connected to the peripheral pixel area of the display panel, and an end of the remaining portion of the optical member 500 is connected to a peripheral pixel area 13 of another display panel. Accordingly, the optical member 500 protrudes from the plurality of display panels.

The optical member 500 may be formed of a bundle of optical fibers, or may be formed of a bundle of optical sheets, which is a form of stacked optical sheets. The bundle of the optical fibers or the bundle of the optical sheets may be provided on, i.e. arranged so as to both extend along, a virtual curved surface connecting spaces between the display areas, or may be affixed so as to both extend along the same virtual straight line.

The optical member 500 has one end that extends parallel to a face of the display area 10, and another area that comes to a point in cross-section. That is, the optical member 500 is wider in areas close to display area 10, and narrower in areas farther from display area 10. Accordingly, when an image having a predetermined area is provided to one end of the optical member 500, an image having a wider area than the predetermined area is displayed through the other end.

An adhesive may be provided between the optical fibers or the optical sheets of the optical member 500 in order to prevent each optical fiber or optical sheet from arbitrarily moving.

In each of the plurality of display panels, an optical member 500 is distributed in the peripheral pixel area and the non-display area 20 adjacent to another display panel. Particularly, an end of a part of the optical member 500 is parallel to display area 10, and the optical member 500 grows narrower with distance from the display area 10. In the embodiment shown, the optical member 500 thus has a triangular cross-section in the view of FIG. 1. One end of the optical member 500 is thus connected to a peripheral pixel area of the second display panel, and the other end thereof is distributed in a peripheral pixel area of the second display panel and an upper surface of the non-display area 20 of the second display panel positioned at the first display panel side. Here, the optical member 500 connected to the non-display area 20 of the first display panel, and the optical member 500 connected to the non-display area 20 of the second display panel, may be disposed to be symmetrical to each other.

The cylinder 530 is positioned to act as a supporting body of the optical member 500, and may be positioned at the upper portion of the non-display area 20 of the display device, in order to support the optical member 500. The cylinder 530 may extend all the way to the top, or uppermost point, of the optical member 500, so as to support the entire length or height of the optical member 500, as shown.

Further, the cylinder 530 serves to fix the plurality of display panels at contact portions of the plurality of display panels, and is formed over the plurality of display panels.

The cylinder 530 does not directly display an image, and may be formed of an opaque material, which is capable of hiding the non-display area.

The cover 600 is formed on an upper surface of the optical member 500.

Part of the cover 600 lies over the display area 10, and part lies over the non-display area 20.

The cover 600, which is a form of a transparent film, may be formed of a polymer or glass, and the polymer may include polymethyl methacrylate (PMMA).

The transparent cover 600 is disposed on the upper surface of the optical member 500 to protect the optical member 500 and help ensure display of a continuous image across the non-display area 20, so that the non-display area 20 is not seen by observers.

The optical member 500 enlarges the outer portion of the displayed image (i.e. that portion which lies under the optical member 500) and displays the enlarged image over its non-display area 20, so that the image may be continuously displayed at the connection portions between adjacent panels. In this manner, observers see the displayed image rather than the non-display areas 20. That is, the non-display areas 20 are effectively "covered up" by magnified portions of the displayed image.

The cover 600 disposed on the upper surface of the optical member 500 according to this exemplary embodiment of the present invention will be described in further detail with reference to FIG. 2.

Figure 2:
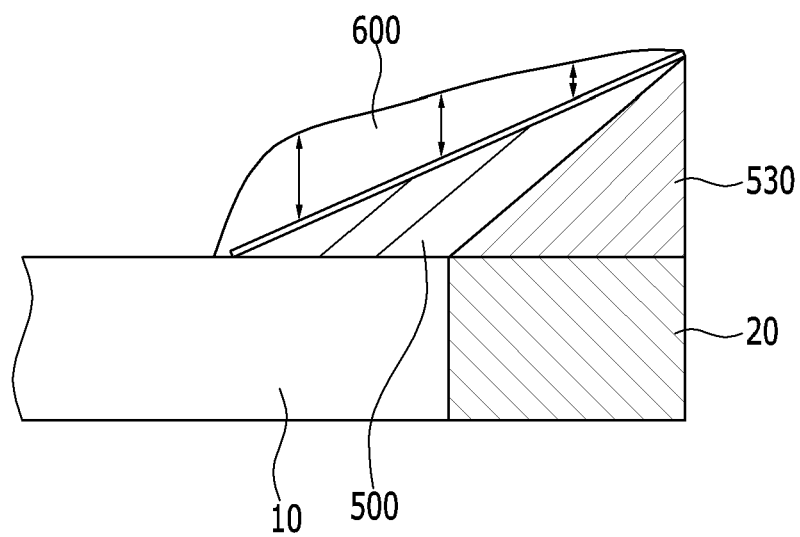
FIG. 2 is a cross-sectional view illustrating a part of the display device adopting the optical member and the cover according to the exemplary embodiment of the present invention.

FIG. 2 is a cross-sectional view illustrating the enlarged connection portion between the plurality of panels of the display device adopting the optical member 500 and the cover 600, according to the exemplary embodiment of the present invention.

The connection portions between the panels includes the display area 10 and the non-display area 20 of the display panel, the cylinder 530, the optical member 500, and the cover 600 covering the optical member.

Two or more display panels are provided, and the display area 10 of the display panel is a region displaying an image, and the non-display area 20 thereof is a region outside the display area 10 in the display panel, and may be covered by a constituent element called a top cover, a top chassis, or a bezel.

The display area 10 includes a plurality of pixels arranged in a matrix form. Each pixel may include pixel electrodes and thin film transistors connected to the pixel electrodes, and the pixel electrodes form an electric field on the liquid crystal layer together with a common electrode in order to display an image.

The display area 10 includes the main pixel area, and the peripheral pixel area formed at one side of the main pixel area. The plurality of main pixels is provided in the main pixel area, and the plurality of peripheral pixels is provided in the peripheral pixel area.

The display panels may be provided on the same flat surface, or may be provided on a curved surface or a bent surface, not the same flat surface The display panel may have a fixed or rigid form, or may be flexible.

One side of the optical member 500 is connected to a part of the display area 10. The optical member 500 extends over the non-display area 20 between two adjacent display areas 10, to be disposed so that the image from the underlying part of the display area 10 may be displayed on the non-display area.

Each display area 10 includes the plurality of pixels, and the optical member 500 overlies or corresponds to a portion of the pixels. Each display area 10 includes the main pixel area and the peripheral pixel area provided between the main pixel area and its adjacent non-display area 20 to be connected to the optical member 500, and each pixel provided in the main pixel area has a larger area than that of each pixel provided in the peripheral pixel area 13.

The optical member 500 may be formed as a bundle of the optical fibers 510, or may be formed as an optical sheet bundle, which is a form of stacked optical sheets 520. The bundle of optical fibers or the bundle of optical sheets may be provided on a virtual curved surface connecting the spaces between adjacent display areas. That is, adjacent display areas may be coplanar or not, and either way, adjacent optical members 500 may be shaped so as to contact each other.

The cylinder 530 is a supporting body for the optical member 500 at the upper portion of the non-display area 20 of the display device, and may have a circular or elliptical cross-section in plan view.

The cylinder 530 may be positioned in order to support the optical member 500 on the non-display area 20, and the optical member 500 may be disposed to be in contact with an inclined plane or surface of the cylinder 530 which serves as a support of the optical member 500. The cylinder 530 may extend all the way to the top, or uppermost point, of the optical member 500, so as to support the entire length or height of the optical member 500, as shown.

Referring to the cover 600 illustrated in FIG. 2, a thickness of the cover 600 disposed on the upper surface of the optical member 500 may be adjusted so as to vary the an output direction and distribution of the light passing through the panels and the optical member 500.

Further, a horizontal width of the transparent cover 600 may also be the same as a horizontal width of the optical member 500 (i.e. the cover 600 may cover the entire upper surface of optical member 500), or may be adjusted to be larger than the horizontal width of the optical member 500 to cover even the display area 10 (i.e. may extend onto the display area 10).

A refractive index of the cover 600 may be lower than a refractive index of the optical member 500.

A thickness of the cover 600 may be from about 0.1 to about 10 mm, and may be vary by horizontal position of the optical member 500, and an upper surface of the cover 600 may be a curved surface or a flat surface.

Luminance of output light and an adjustment of the distribution of light when the cover 600 according to the exemplary embodiment of the present invention is applied will be described in further detail with reference to FIG. 3.

Figure 3:
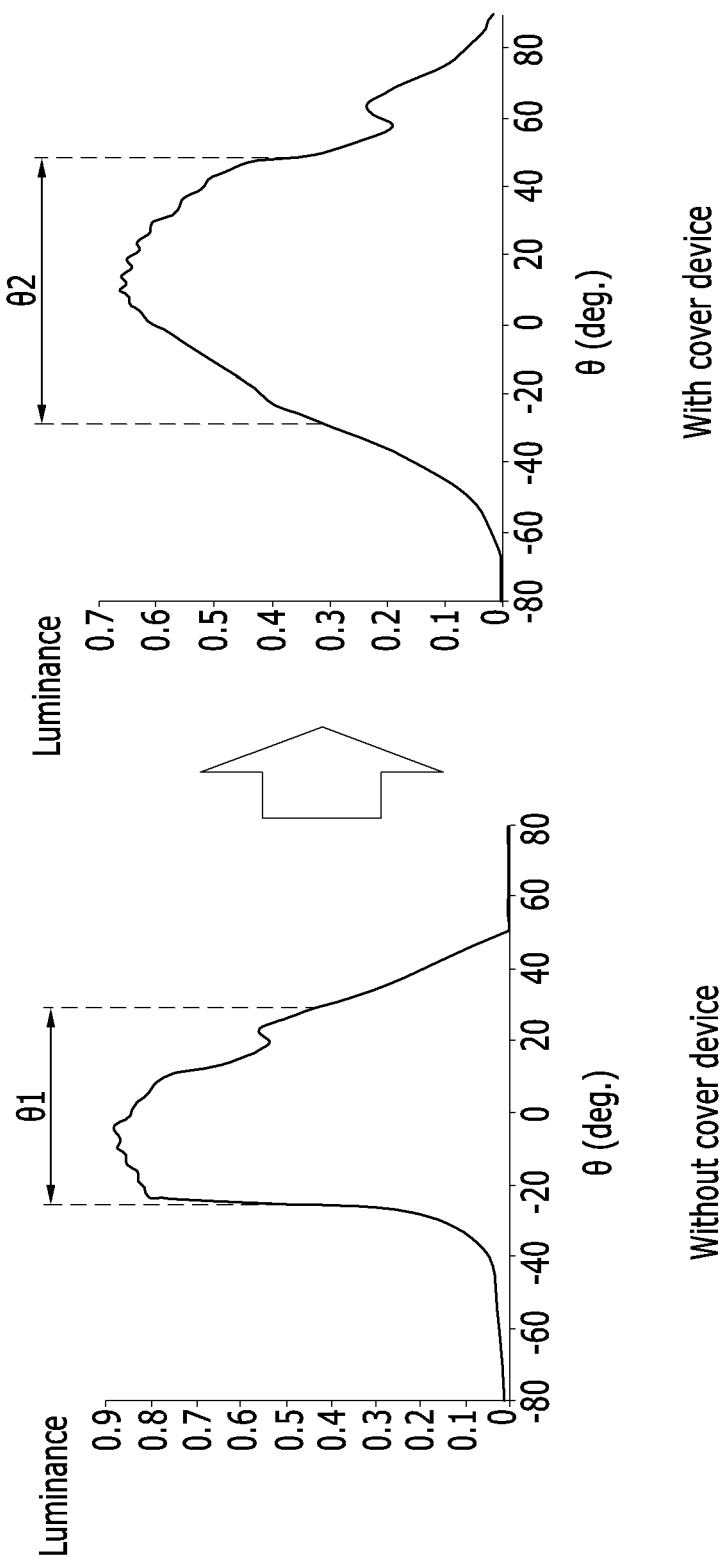
FIG. 3 is a graph illustrating luminance of output light according to angle distribution adjustment before and after a transparent cover of the present invention is applied.

FIG. 3 is a graph illustrating luminance of output light according to angle of light output from the display area before and after the transparent cover of the present invention is applied.

Referring to FIG. 3, the x-axes represent viewing angle relative to the display area 10, and the y-axes represent the corresponding measured luminance of the light output from the display area 10. The left graph represents luminance of output light as a function of viewing angle for a display area 10 to which only the optical member 500 is applied, and the right graph represents luminance of output light as a function of viewing angle for a display area 10 to which the optical member 500 and the cover 600 according to the present exemplary embodiment are applied.

Referring to FIG. 3, it can be seen that viewing angle increases when the cover 600 is applied.

The luminance and distribution of the light output from the display area 10 may be varied by adjusting the thickness of the cover 600 on the upper surface of the optical member 500.

A display device, in which a polarization characteristic of a cover 600 is adjusted according to another exemplary embodiment of the present invention, will be described with reference to FIG. 4. Such a configuration may be used for providing a 3D image.

Figure 4:
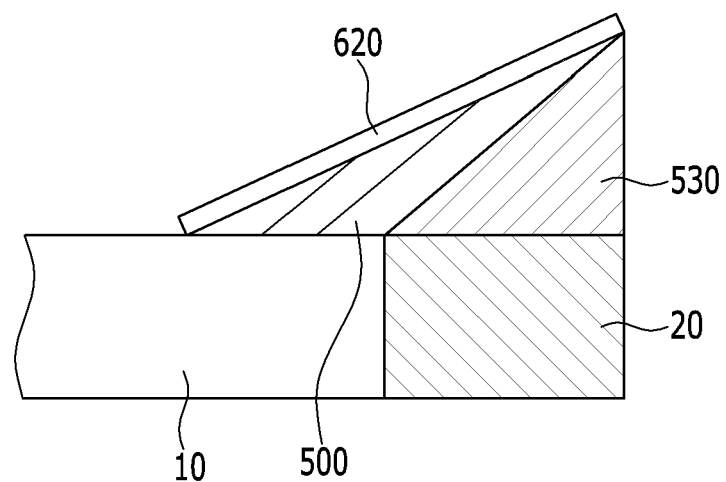
FIG. 4 is a cross-sectional view of a display device adopting an optical member and a polarization film according to another exemplary embodiment of the present invention.

FIG. 4 is a cross-sectional view of a display device with an optical member 500 and a polarization film 620 according to another exemplary embodiment of the present invention.

The display device according to this exemplary embodiment of the present invention includes a display area 10 and a non-display area 20 of a display panel, a cylinder 530, the optical member 500, and the polarization film 620 serving as a cover covering the optical member 500.

The display area 10 and the non-display area 20 of the display panel, the cylinder 530, and the optical member 500 may be substantially the same as those described with reference to FIG. 1.

Referring to FIG. 4, the polarization film 620 may be applied as a cover on the upper surface of the optical member 500.

Further, the polarization film 620 may alternatively be disposed on the upper surface of the cover 600.

An additional polarization film (not illustrated) may be attached to the upper surface of the cover 600 in order to adjust a polarization characteristic altered by the optical member 500, or to implement a 3D image. In this case, the polarization film attached to the upper surface of the optical member 500 may have a polarization axis oriented in the same direction as a polarization axis of the display area 10.

In order to enable a user to recognize a 3D image, a corresponding image is applied to one eye and the corresponding image is blocked from the other eye according to a polarization direction by using polarization eyeglasses, so that both eyes may view different images to feel a stereoscopic effect. Accordingly, the polarization film 620 may be included on the optical member 530, which is applied on the upper side of the non-display area 20, positioned at a center of the display area 10, thereby enabling a 3D image to be displayed when a polarization characteristic of an image displayed on the optical member 530 is maintained.

The image and the light generated in the display area 10 are multi-reflected while passing through the optical member 500, and thus fail to maintain their polarization characteristics. However, various images may be implemented through an adjustment of the polarization characteristic by attaching the polarization film 620 capable of having various polarization axes.

The optical member 500 is disposed to be in contact with the inclined plane or upper surface of the cylinder 530, so that the cylinder 530 supports the optical member 500 along the non-display area 20 of the outer peripheral portion of the panel. The optical member 500 may be protected, and the polarization characteristic for implementing a 3D image may be adjusted, by disposing the polarization film 620 on the upper surface of the optical member 500 or on top of the transparent cover 600.

A display device adopting a cover device 610 according to yet another exemplary embodiment of the present invention will be described in detail with reference to FIGS. 5 to 7.

Figure 5:
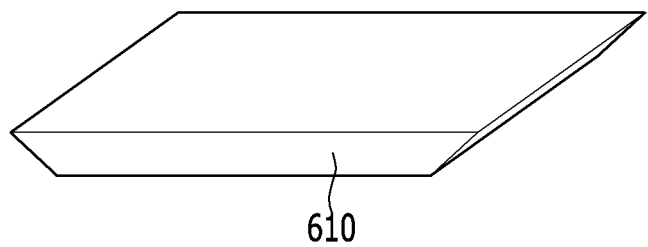
FIG. 5 is a perspective view illustrating a cover device according to yet another exemplary embodiment of the present invention.

FIG. 5 is a perspective view illustrating a cover device according to yet another exemplary embodiment of the present invention. FIG. 6 is a perspective view illustrating a case in which the cover device according to yet another exemplary embodiment of the present invention is applied to a display panel. FIG. 7 is a cross-sectional view of a display device in which the cover device according to yet another exemplary embodiment of the present invention is applied to the display panel.

The display device according to yet another exemplary embodiment of the present invention includes a display area 10 and a non-display area 20 of the display panel, a cylinder 530, an optical member 500, and a cover device 610 covering the optical member 500 and an entire display panel.

The display area 10 and the non-display area 20 of the display panel, the cylinder 530, and the optical member 500 may be substantially the same as those described with reference to FIG. 1.

Figure 6:
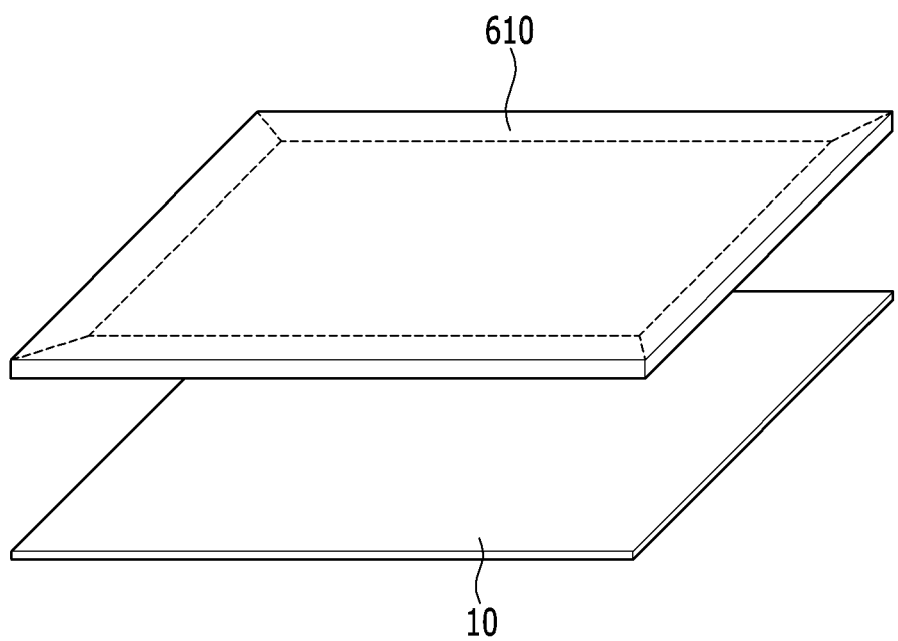
FIG. 6 is a perspective view illustrating a case in which the cover device according to yet another exemplary embodiment of the present invention is applied to a display panel.

Referring to FIGS. 5 and 6, the display device includes the cover device 610 having a surface portion attached to the display panel, and an oblique portion on which the optical member 500 is disposed. The display panel includes the display area 10 and the non-display area 20.

Two or more display panels are provided, and the display area 10 of the display panel is a region displaying an image. The non-display area 20 thereof is a region outside the display area 10 in the display panel, and may be covered by a constituent element called a top cover, a top chassis, or a bezel.

The display area 10 includes a plurality of pixels arranged in a matrix form. Each pixel may include pixel electrodes and thin film transistors connected to the pixel electrodes. The pixels of the display area 10 display an image, and in a case where the display panel is a liquid crystal display, the display panel provides an electric field generated by the pixel electrodes and a common electrode to a liquid crystal layer, so as to display grayscales.

The display area 10 includes a main pixel area, and a peripheral pixel area formed outside of and adjacent to the main pixel area. A plurality of main pixels is provided in the main pixel area, and a plurality of peripheral pixels is provided in the peripheral pixel area.

The peripheral pixel area extends along the non-display area 20 to be close to the adjacent display panel side. That is, in the display panel, the peripheral pixel area is positioned between the main pixel area and the non-display area 20 at the display panel side. The peripheral pixels and the main pixels each display the image.

The display panels may be provided on the same flat surface, or may be provided on a curved surface or a bent surface. The display panel may be rigid or flexible.

Each display panel displays an image, and may include an organic light emitting display panel, a liquid crystal display panel, an electrowetting display panel, an electrophoretic display panel, a microelectromechanical system (MEMS) display panel, a plasma display panel, and the like.

Like the cover 600, the cover device 610, which is a form of the same transparent film, may be formed of a polymer or glass, and the polymer may include polymethyl methacrylate (PMMA).

An inclination angle of the oblique portion of the cover device 610 may be the same as an angle of an upper surface of the optical member 500.

The number of cover devices 610 provided is two or more. The cover devices 610 may be provided on the same flat surface, or may be provided on a curve surface or a bent surface, not the same flat surface. The cover device 610 may be rigid or flexible.

Further, the cover device 610 has a structure in which the upper surface has a greater area than the lower surface.

The oblique portion of the cover device 610 is positioned in the display area 10, and has an angled or beveled edge so that the image is magnified at the edges thereof. The angled edge is positioned over the non-display area 20, so that the magnified image is projected over the non-display area 20. In this manner, the non-display area 20 is covered or hidden by the magnified image.

Each display panel, which may correspond to the cover device 610, displays an image, and may include an organic light emitting display panel, a liquid crystal display panel, an electrowetting display panel, an electrophoretic display panel, a microelectromechanical system (MEMS) display panel, a plasma display panel, and the like.

The plurality of display panels corresponding to the cover devices 610 may be homogeneous display panels or heterogeneous display panels. The display panels may be of the same size or may be of different sizes, and in this case, a size of the cover device 610 may be changed according to a size of each of the plurality of panels.

Figure 7:
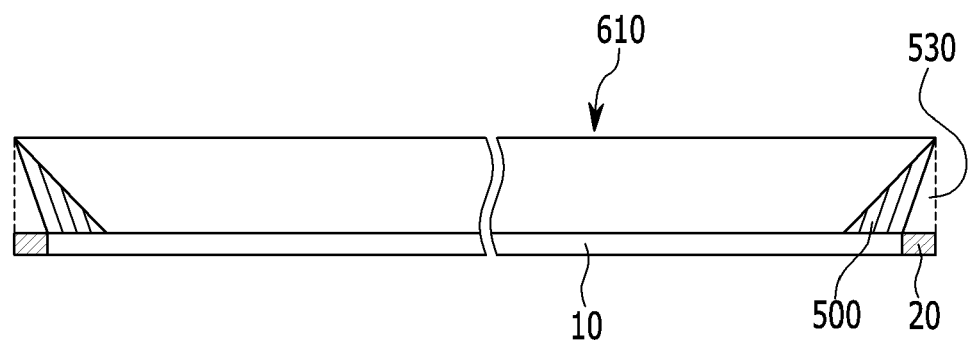
FIG. 7 is a cross-sectional view of a display device in which the cover device according to yet another exemplary embodiment of the present invention is applied to the display panel.

Referring to FIG. 7, one panel for implementing the multi panel display device includes the optical member 500, the cylinder 530 serving as a support of the optical member, the cover device 610, and the display panel including the display area 10 and the non-display area 20.

The cover device 610 protects the optical member 500, and solves a problem in that a polarization characteristic of light passing through the panel is changed by the optical member 500.

Further, a polarization film (not illustrated) may be additionally attached to the upper surface of the cover device 610 in order to adjust a polarization characteristic changed by the optical member 500, or to implement a 3D image. In this case, the polarization film attached to the upper surface of the optical member 500 may have a polarization axis oriented in the same direction as a polarization axis of the display area 10.

An optical member of the display device according to a further exemplary embodiment of the present invention will now be described in detail with reference to FIGS. 8 to 10.

Figure 8:
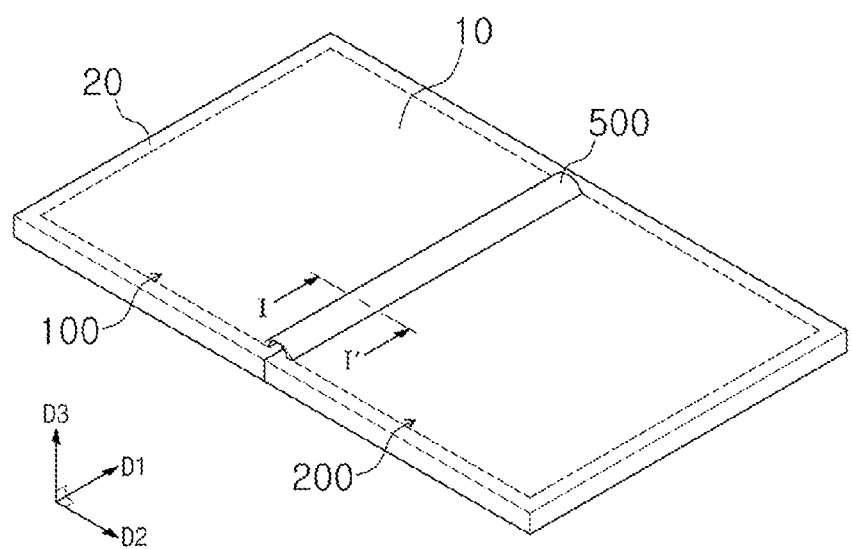
FIG. 8 is a perspective view of a display device with an optical member according to an exemplary embodiment of the present invention.

FIG. 8 is a perspective view of a display device with the optical member according to this exemplary embodiment of the present invention. FIG. 9 is a magnified perspective view illustrating further details of a part of the display device with the optical member according to the exemplary embodiment of the present invention. FIG. 10 is a cross-sectional view taken along line I-I' of FIG. 1.

Figure 9:
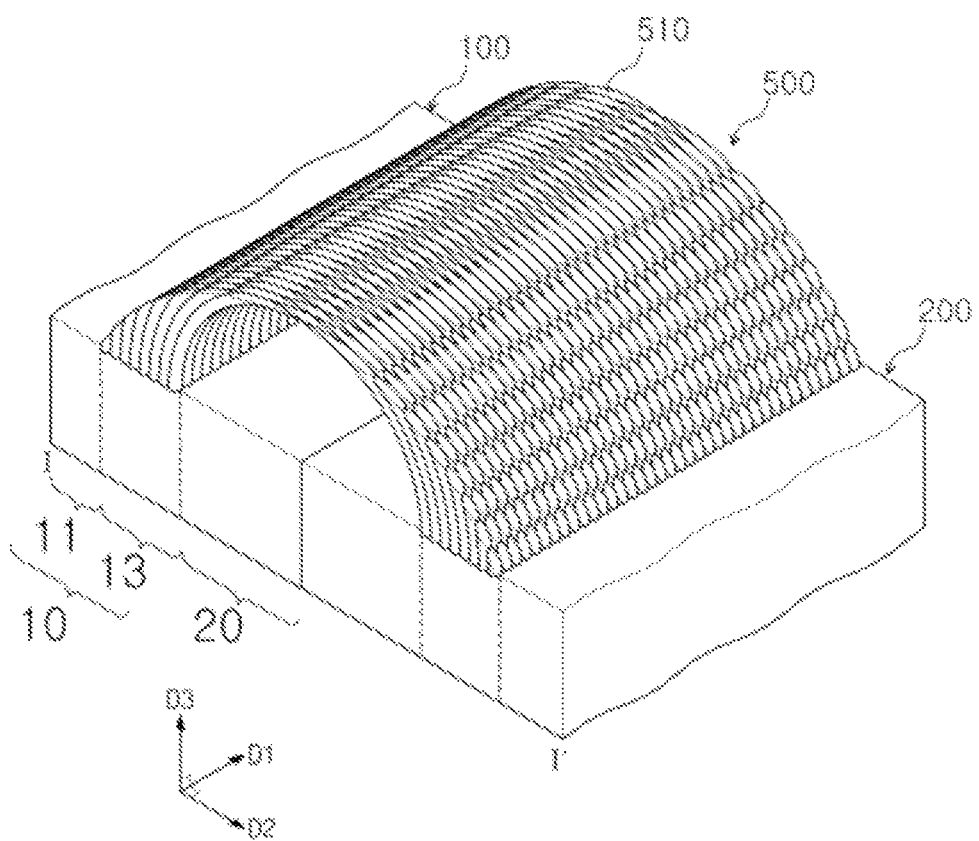
FIG. 9 is a magnified perspective view illustrating further details of a part of the display device with the optical member according to an exemplary embodiment of the present invention.
Figure 10:
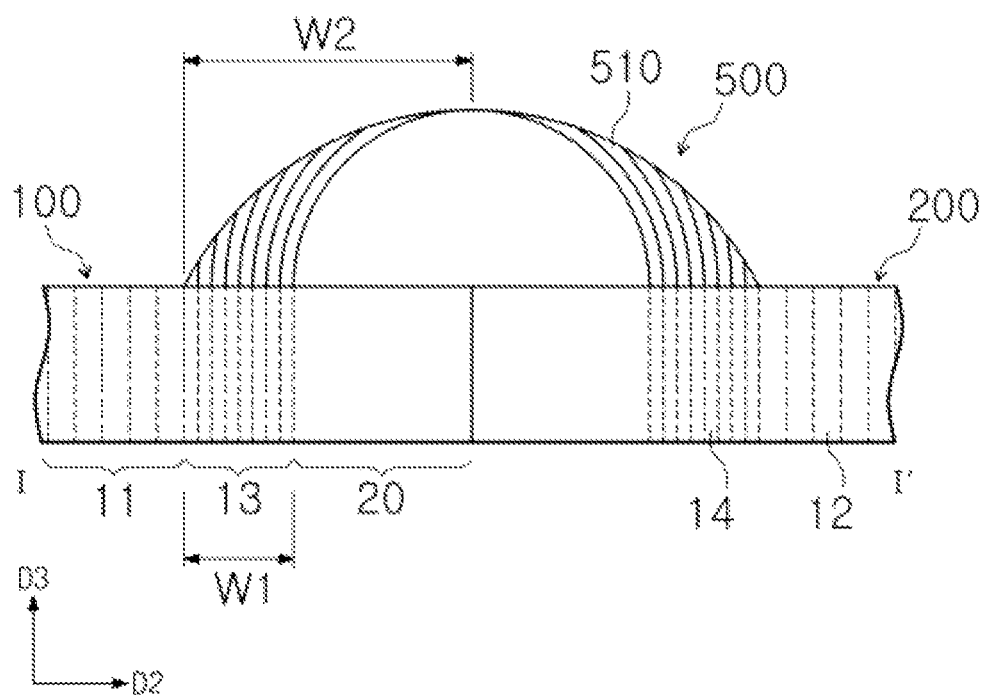
FIG. 10 is a cross-sectional view taken along line I-I' of FIG. 8.

Referring to FIGS. 8 to 10, the display device utilizing the optical member 500 according to the current exemplary embodiment of the present invention includes display panels displaying an image, and the optical member 500 provided between the display panels to be connected to the display panels. Since the number of display panels provided is plural, in the exemplary embodiment of the present invention, two display panels connected in a second direction D2 will be described as an example. The two display panels are called a first display panel 100 and a second display panel 200 for convenience of the description.

The display panels 100 and 200 may have a predetermined thickness, may be provided in a rectangular plate shape having two pairs of parallel sides, and one pair of sides may be longer than the other pair of sides. In the exemplary embodiment of the present invention, the display panels 100 and 200 have rectangular shapes with a pair of long sides and a pair of short sides. Here, in the display panels 100 and 200, it is described that a long side direction is a first direction D1, a short side direction is a second direction D2, and the direction in which the image is projected (i.e. normal to the plane defined by directions D1 and D2) is a third direction D3.

The first display panel 100 and the second display panel 200 are disposed to be adjacent to each other in the second direction D2, so that side surfaces thereof are in contact with each other. In the present exemplary embodiment of the invention, it is illustrated that the first display panel 100 and the second display panel 200 are in contact with each other so that a space is not formed between the two display panels 100 and 200, but in another exemplary embodiment, the first display panel 100 and the second display panel 200 may be spaced apart from each other, and a fixing member (not illustrated) for coupling the first display panel 100 to the second display panel 200 may be provided in the space therebetween.

Each of the first display panel 100 and the second display panel 200 may have a display area 10 displaying an image, and a non-display area 20 outside the display area 10 when viewed in plan view. The image is not displayed in the non-display area 20, and the non-display area 20 is provided along a circumference or outer edge area of the display area 10. The non-display area 20 may be covered by a constituent element called a top cover, a top chassis, or a bezel, and the like which are not illustrated. For example, the constituent element may be provided in a generally quadrangular ring shape covering the non-display area 20 and exposing the display area 10.

The display area 10 includes a plurality of pixels 12 and 14 arranged in matrix form. The respective pixels 12 and 14 include pixel electrodes and thin film transistors connected to the pixel electrodes, and the pixel electrodes form an electric field in a liquid crystal layer together with a common electrode, so as to display an image.

The display area 10 includes a main pixel area 11, a peripheral pixel area 13 formed at one side of the main pixel area 11, a plurality of main pixels 12 provided in the main pixel area 11, and a plurality of peripheral pixels 14 provided in the peripheral pixel area 13. The peripheral pixel area 13 extends in the first direction D1 along the non-display area 20 to be close to the adjacent display panel in the display area 10. That is, in the first display panel 100, the peripheral pixel area 13 is provided between the main pixel area 11 and the non-display area 20 at the second display panel 200 side. In the second display panel 200, the peripheral pixel area 13 is provided between the main pixel area 11 and the non-display area 20 at the first display panel 100 side. The optical member 500 is provided on the peripheral pixel area 13 and a part of the non-display area 20 to display an image.

In the exemplary embodiment of the present invention, the optical member 500 includes a bundle of individual optical fibers 510.

Figure 11:
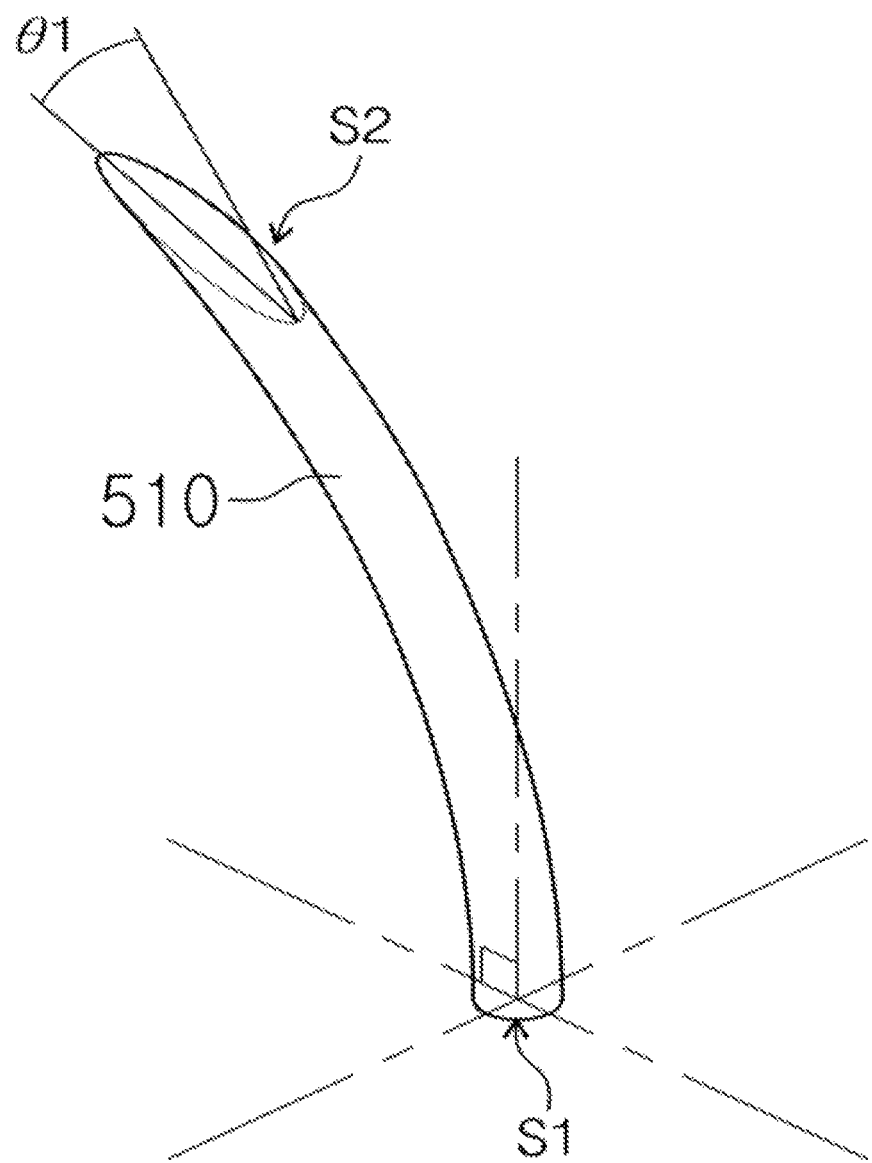
FIG. 11 is a perspective view illustrating one optical fiber in a bundle of optical fibers in an exemplary embodiment of the present invention.

FIG. 11 is a perspective view illustrating one optical fiber 510 in the bundle of the optical fibers in the exemplary embodiment of the present invention. Referring to FIG. 11, each optical fiber 510 has one end S1 cut perpendicular to its major axis and the other end S2 cut at a predetermined angle θ1 with respect to the major axis. A cut surface of the other end S2 has a wider area than a cut surface of end S1. Accordingly, when an image having a predetermined area is provided to one end S1 of the bundle of the optical fibers 510, an image having a wider area than the predetermined area is displayed through the other end S2.

Referring back to FIGS. 8 to 11, one end S1 of the bundle of the optical fibers 510 is connected to the peripheral pixel area 13 in the display area 10. That is, one end S1 of a part (preferably, a half) of the bundle of the optical fibers 510 is connected to the peripheral pixel area 13 of the first display panel 100, and one end S1 of the remaining portion of the bundle of the optical fibers 510, is connected to the peripheral pixel area 13 of the second display panel 200. Accordingly, the bundle of the optical fibers 510 protrudes from the first display panel 100 and the second display panel 200. In the bundle of the optical fibers 510, the respective optical fibers 510 may substantially correspond to the pixels 14 of the peripheral pixel area 13 one-to-one.

In the meantime, an adhesive may be provided between the optical fibers 510 in order to prevent each optical fiber 510 from arbitrarily moving.

In each of the first display panel 100 and the second display panel 200, the bundle of optical fibers 510 is distributed in the peripheral pixel area 13 and over the non-display area 20 adjacent to another display panel. Particularly, one end S1 of the bundle of optical fibers 510 is vertically connected to the peripheral pixel area 13 of the first display panel 100, and the other end S2 thereof is distributed in the peripheral pixel area 13 of the first display panel 100 and over an upper surface of the non-display area 20 of the first display panel 100 positioned at the second display panel 200 side. One end S1 of the remaining part of the bundle of optical fibers 510 is connected to the peripheral pixel area 13 of the second display panel 200, and the other end S2 thereof is distributed in the peripheral pixel area 13 of the second display panel 200, and over the upper surface of the non-display area 20 of the second display panel 200 positioned at the first display panel 100 side. Here, the bundle of optical fibers 510 connected to the non-display area 20 of the first display panel 100 and the bundle of optical fibers 510 connected to the non-display area 20 of the second display panel 200 may be disposed symmetrically to each other.

The bundle of optical fibers 510 is positioned at an upper portion spaced apart from the non-display areas 20 of the first display panel 100 and the second display panel 200. In the exemplary embodiment of the present invention, the areas between the bundle of optical fibers 510 and the non-display areas 20 of the first and second display panels 100 and 200 may be empty. However, in another exemplary embodiment of the present invention, a supporting part may be provided in these spaces so that the bundle of optical fibers 510 is more stably supported. The supporting part may be, for example, a semicircular pillar or a semi-elliptical pillar, or any other shape that can support optical fibers 510.

In the meantime, in the first display panel 100, when it is assumed that a width of the peripheral pixel area 13 in the second direction D2 is referred to as a first width W1, a width in the second direction D2 from the peripheral pixel area 13 to the non-display area 20 adjacent to the second display panel 200 is referred to as a second width W2, cross-sections of ends S1 of the bundle of optical fibers 510 connected to the first display panel 100 have areas corresponding to the first width W1, and cross-sections of the other ends S2 thereof have areas corresponding to the second width W2. That is, the ends S2 collectively cover the entire width W2.

Surfaces of the other ends S2 of the bundle of optical fibers 510 may be observed as if each optical fiber 510 represents one pixel when viewed from an upper side (that is, when viewed by a user). In this exemplary embodiment of the present invention, a cross-sectional area of the other end S2 of each optical fiber 510 may be sized so as to be viewed to a user as a size substantially the same as or similar to an area of each main pixel 12 of the main pixel area 11. Accordingly, each of the cross-sections of the other ends S2 may be provided to have an area substantially the same as or similar to the area of each of the main pixels 12 of the main pixel area 11 when viewed from an upper side. In this case, the area of each of the peripheral pixels 14 in the peripheral pixel area 13 is smaller than the area of each of the main pixels 12 in the main pixel area 11. Here, an area of a cut portion may be adjusted by altering the angle at which the ends S2 are cut with respect to the major axes of their optical fibers 510.

However, as described in this exemplary embodiment of the present invention, the areas of the main pixel 12 and the peripheral pixel 14 may be different when viewed from the upper side, and areas between the peripheral pixels 14 may also be different. Even though the areas of the main pixel 12 and the peripheral pixel 14, or the areas between the peripheral pixels 14, are different from each other, a region covered by the bundle of optical fibers 510 corresponds to a smaller portion compare with whole area of first and second display panels 100 and 200, so that a large visual difference may not be exhibited.

In the meantime, when it is assumed that there is a virtual curved surface connecting a boundary between the main pixel area 11 and the peripheral pixel area 13 of the first display panel 100 and a boundary between the main pixel area 11 and the peripheral pixel area 13 of the second display panel 200, and protruding from the first and second display panels 100 and 200, the other end S2 of the bundle of optical sheets 520 is provided on the virtual curved surface. The optical fibers 510 provided along the virtual curved surface may have different areas according to the position of the pixels of the corresponding peripheral pixel areas 13.

In the display device, the respective display panels, that is, the first display panel 100 and the second display panel 200, may be synchronized to display one image or different parts of the same image. However, the display panels are not limited thereto, and may display different images as a matter of course.

In the display device having one structure, the phenomena of an image discontinuity and image distortion at an edge between adjacent display panels is prevented. Further, the non-display area between adjacent display panels is covered so that the non-display area is not recognized by the eyes of a user, and thus the images displayed by the respective display panels form one continuous composite image.

Figure 12A:
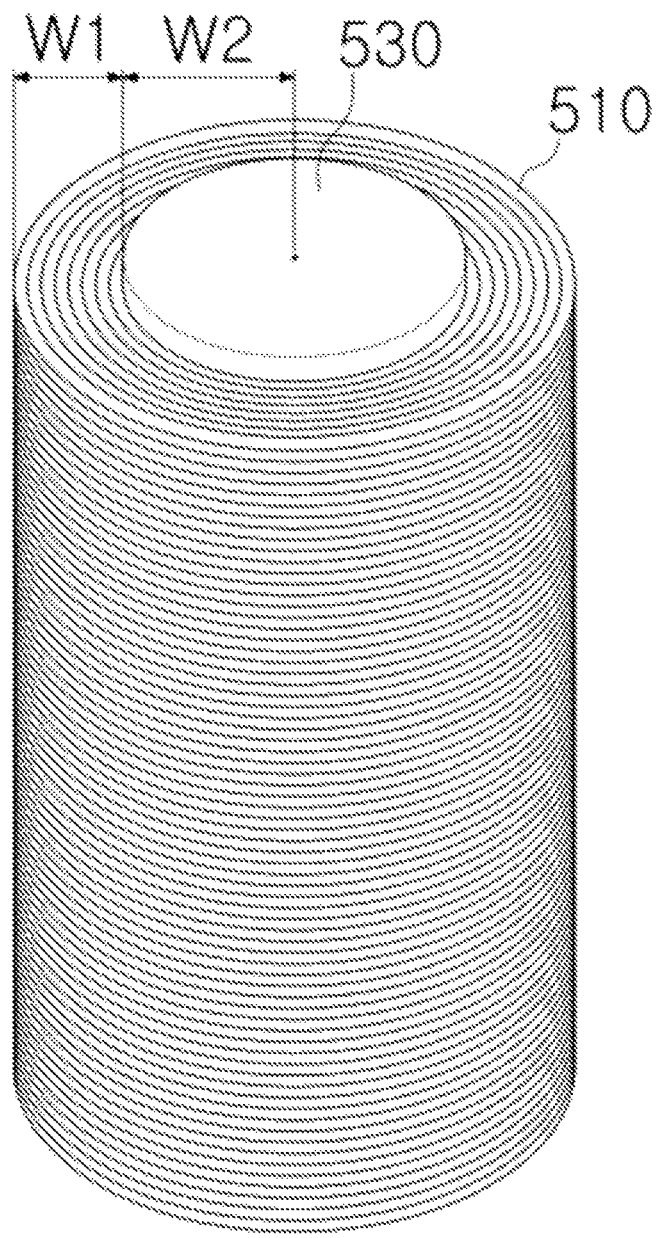
FIGS. 12A to 12C are perspective views illustrating a method of manufacturing the optical member according to the exemplary embodiment of the present invention.
Figure 12B:
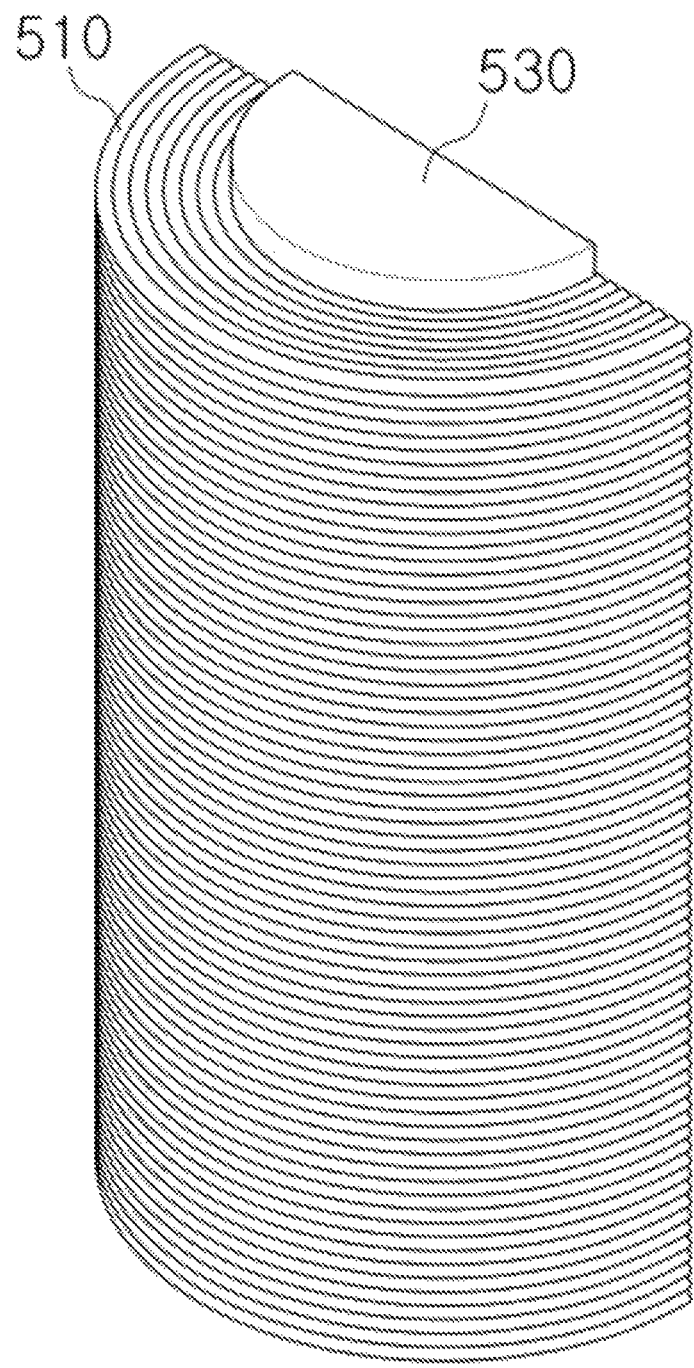
Figure 12C:
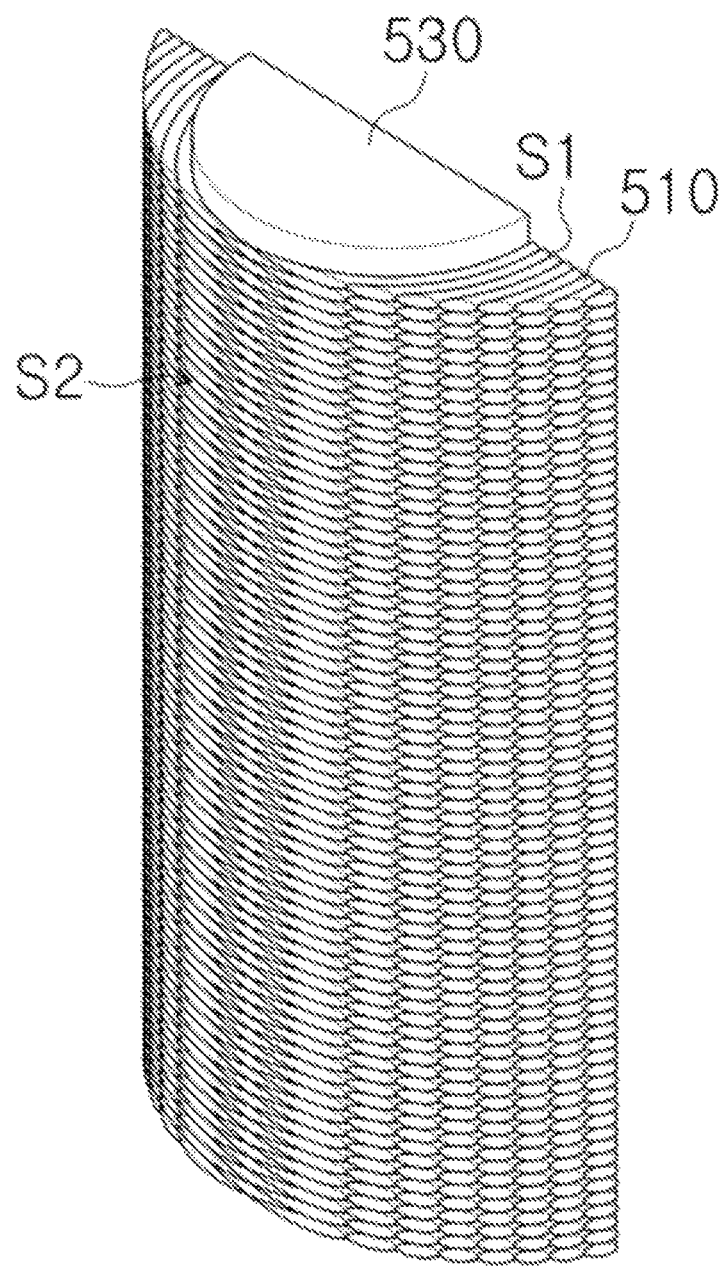

FIGS. 12A to 12C are perspective views illustrating a method of manufacturing the optical member 500, that is, the bundle of optical fibers 510, according to an exemplary embodiment of the present invention.

Referring to FIG. 12A, in order to manufacture a bundle of optical fibers 510, the cylinder 530 is first prepared. A cross-section of the cylinder 530 may be a circle or an ellipse. In a case where the cross-section of the cylinder 530 is a circle, a diameter of the circle may be set to have the same value as a width of an area in which the two non-display areas 20 between the display area 10 of the first display panel 100 and the display area 10 of the second display panel 200 are combined. In a case where the cross-section of the cylinder 530 is an ellipse, a long axis or a short axis of the ellipse may be set to have the same value as a width of an area in which the two non-display areas 20 between the display area 10 of the first display panel 100 and the display area 10 of the second display panel 200 are combined.

Next, the optical fibers 510 are wound around the cylinder 530. In this case, the optical fibers 510 are wound to a thickness corresponding to the first width W1 from a surface of the cylinder 530. The cylinder 530 wound with the bundle of the optical fibers 510 is a cylinder having the second width W2 as a radius.

Then, as illustrated in FIG. 12B, the bundle of the optical fibers 510 is cut to have a form appropriate to the first and second display panels 100 and 200. In this case, the cylinder 530 may be cut as illustrated in FIG. 12B.

The bundle of optical fibers 510 is cut to have one end S1 perpendicular to the extension direction of each optical fiber 510. For example, in a case where the cross-section of the cylinder 530 is a circle, the cylinder 530 and the bundle of optical fibers 510 are cut along and through the major axis of the cylinder 530. In a case where the cross-section of the cylinder 530 is an ellipse, the cylinder 530 and the bundle of optical fibers 510 may be cut along and through the lengthwise axis of the cylinder 530 so as to pass through the long axis or the short axis of the cross-section of the cylinder 530, which is set to have the same value as the width of the non-display area 20. Here, the respective optical fibers 510 of the cut bundle of optical fibers 510 have cross-sections perpendicular with respect to their lengthwise axes.

Next, as illustrated in FIG. 12C, the bundle of the optical fibers 510 is cut to have the other end S2 oblique with respect to the lengthwise axis of each optical fiber 510. For example, in a case where the cross-section of the cylinder 530 is a circle, a virtual ellipse having a cut line passing the center of the circle as a long axis and a diameter of the cylinder 530 vertical to the cut line as a short axis may be set, and the bundle of optical fibers 510 may be cut in the extension direction of the cylinder 530 along the outer edge of the ellipse.

In a case where the cross-section of the cylinder 530 is an ellipse, a virtual ellipse having a cut line passing the center of the ellipse as a long axis (or a short axis) and a diameter of the cylinder 530 vertical to the cut line as a short axis (or the long axis) may be set, and the bundle of optical fibers 510 may be cut in the extension direction of the cylinder 530 along the outer edge of the ellipse. Here, the respective optical fibers 510 have cross-sections oblique with respect to their lengthwise axes.

The bundle of optical fibers 510 manufactured by one method is attached to the peripheral pixel areas 13 of the first display panel 100 and the second display panel 200. In the exemplary embodiment, the cylinder 530 may be removed and the bundle of the optical fibers 510 may be attached to the peripheral pixel areas 13, and in another exemplary embodiment, the bundle of the optical fibers 510 may be attached to the peripheral areas together with the cylinder 530. In this case, the cylinder 530 is used as a supporting part for supporting the bundle of the optical fibers 510.

In the meantime, in order to attach the bundle of optical fibers 510 to the peripheral pixel areas 13, a transparent adhesive may be used between upper surfaces of display units of the first display panel 100 and the second display panel 200, and the cross-section of one end S1 of the bundle of optical fibers 510. Further, in the bundle of optical fibers 510, an adhesive for fixing the optical fibers 510 may be used between the optical fibers 510.

However, the method of manufacturing the optical member according to the exemplary embodiment of the present invention is not limited thereto, and may include a method of forming the optical member by cutting each optical fiber, and a method of positioning the optical fibers in other ways besides that shown.

The optical member may be simply manufactured by using one method.

Figure 13:
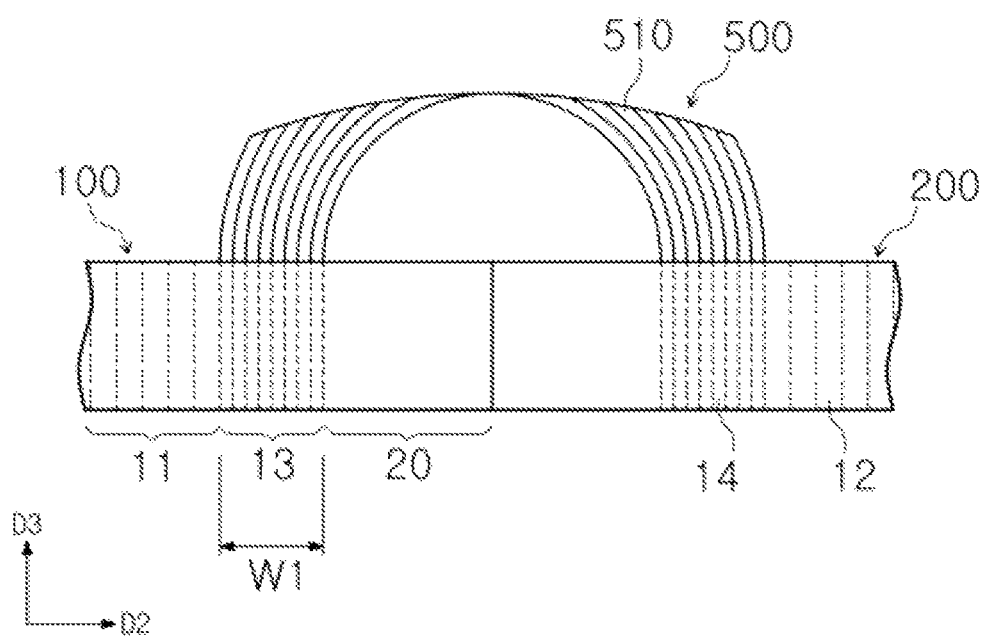
FIG. 13 is a cross-sectional view illustrating another exemplary embodiment of a display device adopting the optical member of the present invention.

FIG. 13 is a cross-sectional view illustrating another exemplary embodiment of a display device adopting the optical sheet of the present invention.

Referring to FIG. 13, a degree of inclination of the bundle of optical fibers 510, and an inclination angle, an area, and the like of the cross-section of the other end of the optical fiber 510 may take on various values, any of which are contemplated by various embodiments of the invention. A size of the pixel viewed by a user through the bundle of the optical fibers 510 may be optimized to be substantially the same as the size of the main pixel 12 of the main pixel area 11.

Figure 14:
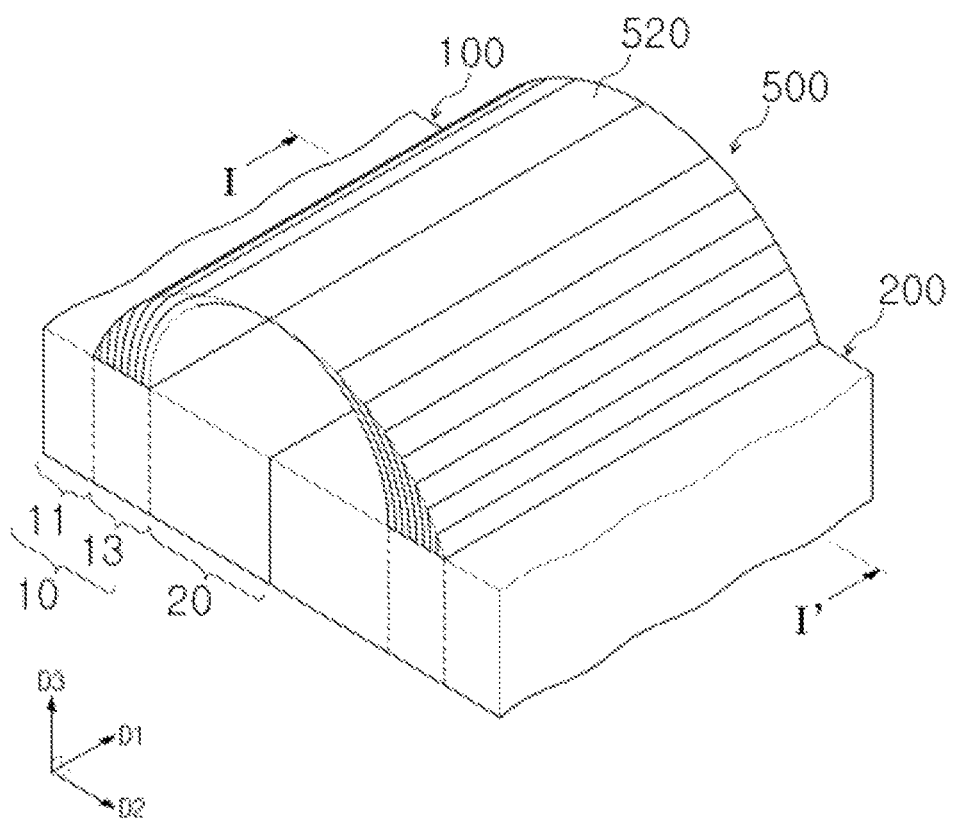
FIG. 14 is a perspective view illustrating a part of a display device adopting the optical member according to yet another exemplary embodiment of the present invention.
Figure 15:
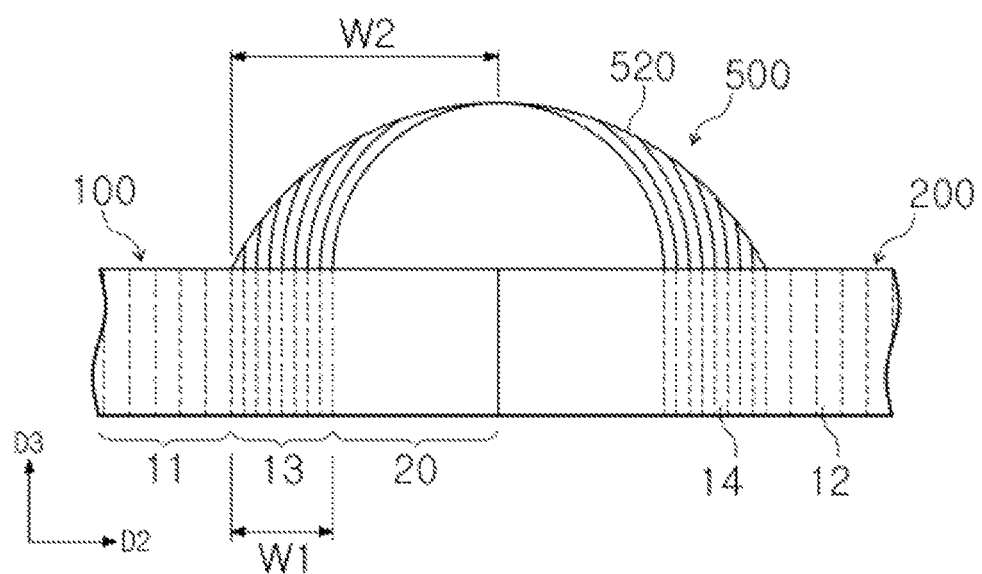
FIG. 15 is a cross-sectional view taken along line I-I' of FIG. 14.

FIG. 14 is a perspective view illustrating a part of a display device adopting an optical sheet according to yet another exemplary embodiment of the present invention. FIG. 15 is a cross-sectional view taken along line I-I' of FIG. 14.

Hereinafter, in the display device according to this exemplary embodiment of the present invention, for convenience of the description, differences from the exemplary embodiment of the present invention will be focused on, and any redundant descriptions are largely omitted.

Referring to FIGS. 8, 14, and 15, a display device includes a plurality of display panels, that is, a first display panel 100 and a second display panel 200, and an optical member 500. Each display panel has a display area 10 and a non-display area 20. The display area 10 includes a main pixel area 11 and a peripheral pixel area 13, which are formed of main pixels 12 and peripheral pixels 14, respectively.

In the present exemplary embodiment, the optical member 500 includes a bundle of optical sheets 520. The bundle of optical sheets 520 is a stack of individual optical sheets 520. The optical sheet 520 extends in a first direction D1.

Each optical sheet 520 of the bundle of optical sheets 520 is a constituent element corresponding to the optical fiber 510 of the previous exemplary embodiment. At least one surface of the bundle of optical sheets 520 may be reflection coated to continuously reflect light incident to the optical sheet 520, and to provide the image to another side surface which is not reflection coated. The bundle of optical sheets 520 protrudes from the first and second display panels 200, and an image is displayed in a direction of the upper surface.

Figure 16:
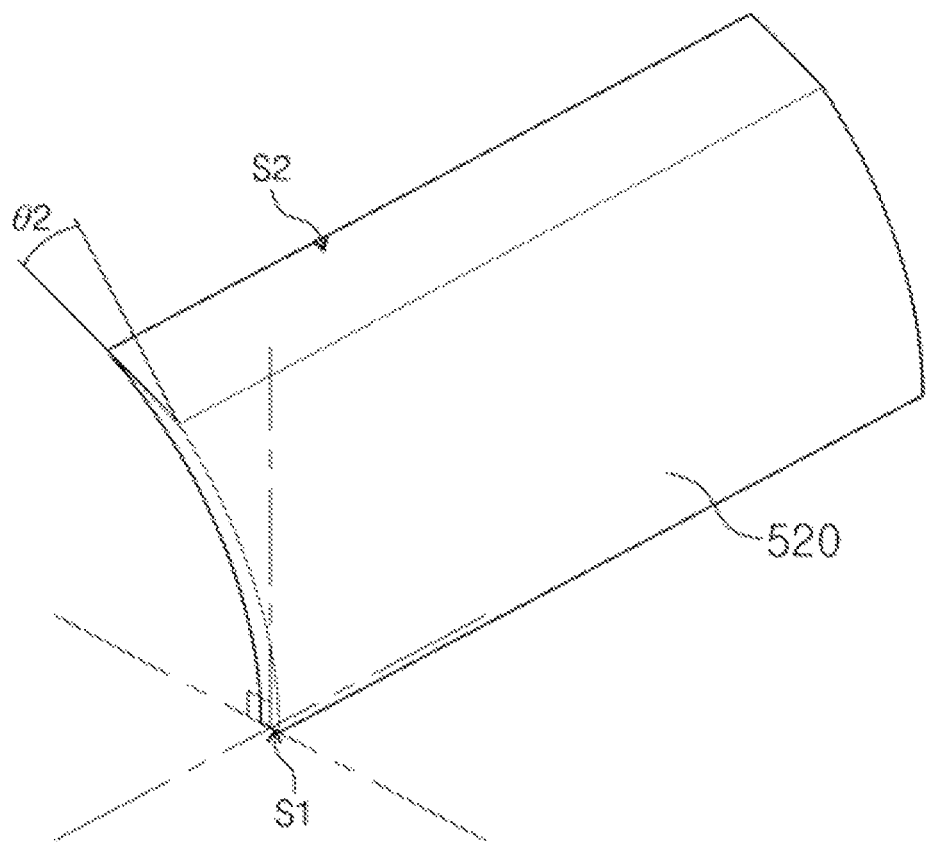
FIG. 16 is a perspective view illustrating one optical sheet in a bundle of optical sheets.

FIG. 16 is a perspective view illustrating one optical sheet 520 in the bundle of the optical sheets 520. Referring to FIG. 16, each optical sheet 520 extends along the first direction D1. In the optical sheet 520, a cross-section positioned along the first direction D1 has a similar form to that of the optical fiber 510 in the aforementioned exemplary embodiment. The cut surface has one end S1 cut to be perpendicular to direction D3, and the other end S2 cut at angle θ2 to be oblique with respect to the major axis of the sheet 520 when viewed in cross-section. A cut surface of the other end S2 has a greater width than that of a cut surface of one end S1. Accordingly, when an image having a predetermined width is provided to one end S1 of the bundle of the optical sheets, an image having a greater width than the predetermined width is displayed through the other end S2.

Referring back to FIGS. 8, 14, and 15, one end of the bundle of optical sheets 520 is connected to the peripheral pixel areas 13 in the display areas 10. That is, ends S1 of some of the optical sheets 520 are connected to the peripheral pixel area 13 of the first display panel 100, and ends S1 of the remaining portion optical sheets 520 are connected to the peripheral pixel area 13 of the second display panel 200. In the bundle of optical sheets 520, the respective optical sheets 520 correspond to the plurality of peripheral pixels 14 of the peripheral pixel area 13, and particularly, the respective optical sheets 520 correspond to the peripheral pixels 14 arranged in the column direction of the non-display area 20.

The bundle of optical sheets 520 is distributed in the peripheral pixel area 13 and over the non-display area 20 adjacent to another display panel. Particularly, ends 51 of some of the optical sheets 520 are connected to the peripheral pixel area 13 of the first display panel 100, and the other ends S2 thereof are distributed in the peripheral pixel area 13 of the first display panel 100 and over an upper surface of the non-display area 20 of the first display panel 100 positioned at the second display panel 200 side. Ends S1 of the remaining optical sheets 520 are connected to the peripheral pixel area 13 of the second display panel 200, and the other ends S2 thereof are distributed in the peripheral pixel area 13 of the second display panel 200 and over an upper surface of the non-display area 20 of the second display panel 200 positioned at the first display panel 100 side. The bundle of optical sheets 520 connected to the non-display area 20 of the first display panel 100 and the bundle of optical sheets 520 connected to the non-display area 20 of the second display panel 200 may be disposed symmetrically with respect to each other.

The bundle of optical sheets 520 is positioned at an upper portion spaced apart from the non-display areas 20 of the first and second display panels 100 and 200, similar to the bundle of optical fibers 510. In the exemplary embodiment of the present invention, spaces between the bundle of optical sheets 520 and the non-display areas 20 of the first and second display panels 100 and 200 may be empty. However, in another exemplary embodiment of the present invention, a supporting part may be provided in the spaces so that the bundle of optical sheets 520 is more stably supported. The supporting part may be a semicircular pillar or a semi-elliptical pillar, or may have any other shape that can support the optical sheets 520.

In the meantime, in the first display panel 100, when it is assumed that a width of the peripheral pixel area 13 in the second direction D2 is referred to as a first width W1, and a width of the non-display area 20 and adjacent area 14 of the second display panel 200 in the second direction D2 is referred to as a second width W2, cross-sections of ends 51 of the bundle of optical sheets 520 connected to the first display panel 100 have areas corresponding to the first width W1, and cross-sections of the other ends S2 thereof have areas corresponding to the second width W2.

In the meantime, when it is assumed that there is a virtual curved surface connecting a boundary between the main pixel area 11 and the peripheral pixel area 13 of the first display panel 100 and a boundary between the main pixel area 11 and the peripheral pixel area 13 of the second display panel 100, and protruding from the first and second display panels 100 and 200, the other end S2 of the bundle of optical sheets 520 is provided on the virtual curved surface. That is, the ends S2 of the optical sheets 520 collectively form a curved surface. The optical sheets 520 provided along this curved surface may have different areas according to positions of the pixels of the corresponding peripheral pixel areas 13.

In the display device, the respective display panels, that is, the first display panel 100 and the second display panel 200, may be synchronized to display one image, or different parts of the same image. However, the display panels are not limited thereto, and may display different images as a matter of course.

In the display device having one structure, the phenomena of image discontinuity and image distortion at edges between adjacent display panels are prevented. Further, the non-display area between adjacent display panels is covered so that the non-display area is not recognized by the eyes of a user, and thus the images displayed by the respective display panels are connected to the adjacent images. That is, a single continuous image is projected, rather than discontinuous parts of an image.

The method of manufacturing the optical member 500, that is, the bundle of optical sheets 520, according to the exemplary embodiment of the present invention is substantially the same as the manufacturing method illustrated in FIGS. 12A to 12C.

In the meantime, in order to attach the bundle of optical fibers 510 to the peripheral pixel areas 13, a transparent adhesive may be used between upper surfaces of display units of the first display panel 100 and the second display panel 200, and the cross-section of one end S1 of the bundle of optical sheets 520. Further, in the bundle of optical sheets 520, an adhesive for fixing the optical sheets 520 may be used between the optical sheets 520.

The bundle of optical sheets 520 is attached to the peripheral pixel areas 13 of the first and second display panels 100 and 200.

Figure 17:
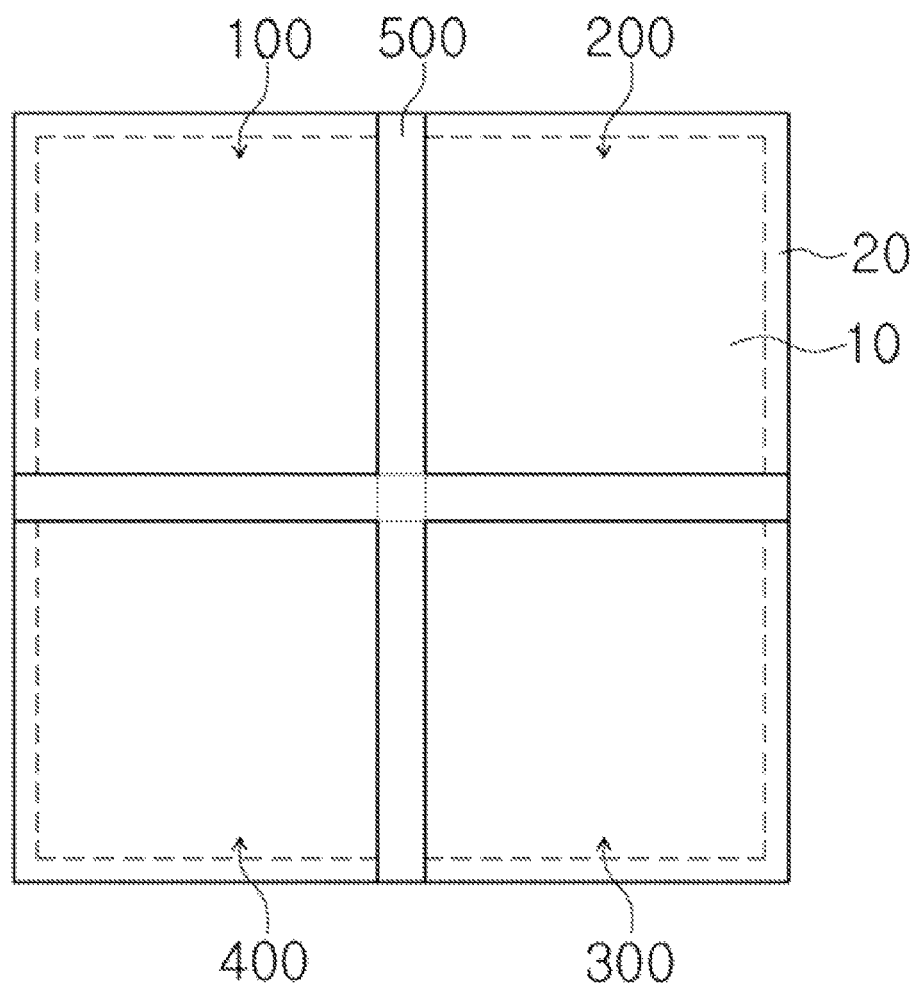
FIG. 17 is a top plan view illustrating a display device according to still yet another exemplary embodiment of the present invention.

FIG. 17 is a top plan view illustrating a display device according to still another exemplary embodiment of the present invention.

Referring to FIG. 17, the display device includes a plurality of display panels, that is, first to fourth display panels 100, 200, 300, and 400, and the display panels 100, 200, 300, and 400 are arranged in a 2×2 matrix form. Each of the first to fourth display panels 100, 200, 300, and 400 has a display area 10 and a non-display area 20, as well as an optical member 500 and a cover 600 connected to a part of the display area 10 and covering the non-display area 20 between adjacent display panels 100, 200, 300, and 400. A cover device 610 may also be used instead of the cover 600.

As described above, the display panels may be arranged in a matrix shape having various forms. For example, when four display panels are provided, the display panels may be arranged in a 1×4 matrix form or a 4×1 matrix form. Further, a larger number of display panels, for example, nine display panels, may be arranged in a 3×3 matrix form. Otherwise, the display panels may be connected to be adjacent to each other in some other arrangement besides that of a matrix.

As described above, the multi panel display device according to the exemplary embodiment of the present invention may prevent the phenomena of image discontinuity and image distortion at edges between the display panels, and adjust a polarization characteristic to provide a high-quality large screen capable of implementing a 3D image and the like.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. The various features of the different embodiments may be mixed and matched to create other embodiments contemplated by the invention.

<Description of symbols>

| | |
|---|---|
| 530: Cylinder | 510: Optical fiber |
| 10: Display area | 520: Optical sheet |
| 100: First display panel | 11: Main pixel area |
| 200: Second display panel | 13: Peripheral pixel area |

-continued

<Description of symbols>

| | |
|---|---|
| 20: Non-display area | 600: Cover |
| 500: Optical member | 610: Cover device |
| 620: Polarization film | |

What is claimed is:

1. A display device, comprising:
a plurality of display panels including display areas configured to display an image, and non-display areas positioned alongside the display areas;
an optical member having one side connected to a part of one of the display areas and an opposing side extending over an adjacent non-display area, the optical member configured to magnify an image from the part of one of the display areas and to project the magnified image over the adjacent non-display area; and
a cover covering the optical member, wherein a refractive index of the cover is lower than a refractive index of the optical member, and wherein a thickness of the cover is from about 0.1 to about 10 mm.

2. The display device of claim 1, wherein:
each display area includes a plurality of pixels, and the one side of the optical member is positioned over at least some of the pixels.

3. The display device of claim 2, wherein:
the optical member is a bundle of optical fibers, or a bundle of optical sheets.

4. The display device of claim 3, wherein:
faces of the opposing sides of the optical member collectively form a curved surface extending from one of the display areas to another one of the display areas.

5. The display device of claim 1, wherein the cover comprises a transparent polymer or a glass.

6. The display device of claim 5, wherein:
the cover comprises polymethyl methacrylate (PMMA).

7. The display device of claim 5, wherein:
the cover is configured to alter a polarization of light emitted from the display panel and passing therethrough.

8. The display device of claim 5, wherein:
a thickness of the cover varies by position along the cover.

9. The display device of claim 5, wherein:
the cover covers one entire display panel, an upper surface of the cover has substantially the same area as an upper surface of the corresponding display panel, and
a side surface of the cover is oriented at the same inclination angle as that of a surface of the optical member.

10. The display device of claim 1, wherein:
an upper surface of the cover has a curved surface or a flat surface.

11. The display device of claim 1, wherein the cover is a polarization film or further includes a polarization film on at least an upper portion of the cover.

12. The display device of claim 11, wherein:
a polarization axis of the polarization film has the same direction as that of a polarization axis of the display area.

13. The display device of claim 1, wherein each display area includes a main pixel area and a peripheral pixel area positioned between the main pixel area and the adjacent non-display area, wherein the optical member is positioned over the peripheral pixel area of the one of the display areas, and wherein pixels of the main pixel areas have areas larger than those of pixels of the peripheral pixel areas.

* * * * *